(12) United States Patent
Lee et al.

(10) Patent No.: US 11,654,895 B2
(45) Date of Patent: May 23, 2023

(54) APPARATUS FOR RECOGNIZING PARKING AREA FOR AUTONOMOUS PARKING AND METHOD THEREOF

(71) Applicant: HYUNDAI MOBIS CO., LTD., Seoul (KR)

(72) Inventors: Won June Lee, Yongin-si (KR); Hye Rin Kim, Yongin-si (KR); So Hee You, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 205 days.

(21) Appl. No.: 17/136,371

(22) Filed: Dec. 29, 2020

(65) Prior Publication Data

US 2022/0161784 A1 May 26, 2022

(30) Foreign Application Priority Data

Nov. 25, 2020 (KR) .................. 10-2020-0160344

(51) Int. Cl.
*G06K 9/00* (2022.01)
*B60W 30/06* (2006.01)
*G06T 7/73* (2017.01)
*G06N 3/08* (2023.01)
(Continued)

(52) U.S. Cl.
CPC ............ *B60W 30/06* (2013.01); *G06N 3/08* (2013.01); *G06T 7/74* (2017.01); *G06V 20/586* (2022.01); *G06V 20/588* (2022.01); *G06T 2207/20081* (2013.01); *G06T 2207/20084* (2013.01);
(Continued)

(58) Field of Classification Search
CPC .. B60W 30/06; B60W 2420/42; B60W 40/02; B60W 50/14; B60W 60/001; G06N 3/08; G06T 7/74; G06T 2207/20081; G06T 2207/20084; G06T 2207/30256;
(Continued)

(56) References Cited

U.S. PATENT DOCUMENTS

| 2015/0130640 A1 | 5/2015 | Ryu et al. |
| 2016/0034768 A1* | 2/2016 | Lee .................... H04N 5/23293 382/103 |
| 2017/0017848 A1* | 1/2017 | Gupta .................. G06V 20/588 |

(Continued)

FOREIGN PATENT DOCUMENTS

| KR | 10-2017-0065893 | 6/2017 |
| KR | 10-2020-0068045 | 6/2020 |
| KR | 10-2020-0071842 | 6/2020 |

OTHER PUBLICATIONS

Notice of Allowance dated May 27, 2022, issued to Korean Patent Application No. 10-2020-0160344.

*Primary Examiner* — Dhaval V Patel
(74) *Attorney, Agent, or Firm* — H.C. Park & Associates, PLC

(57) ABSTRACT

A vehicle parking assistance device includes an image sensing device, an artificial intelligence learning device, and a controller connected with the image sensing device and the artificial intelligence learning device. The controller is configured to obtain an image using the image sensing device, detect at least one parking line pair in the obtained image, detect a parking slot based on deep learning, detect a parking area based on the detected parking slot and the at least one detected parking pair, detect an entrance point for the parking area, and generate parking information based on the parking area and the entrance point.

18 Claims, 19 Drawing Sheets

(51) Int. Cl.
*G06V 20/58* (2022.01)
*G06V 20/56* (2022.01)

(52) U.S. Cl.
CPC ............... *G06T 2207/30256* (2013.01); *G06T 2207/30264* (2013.01)

(58) Field of Classification Search
CPC ........ G06T 2207/30264; G06V 20/586; G06V 20/588; G08G 1/168
See application file for complete search history.

(56) References Cited

U.S. PATENT DOCUMENTS

| | | | |
|---|---|---|---|
| 2017/0043808 A1* | 2/2017 | Yang | B62D 15/021 |
| 2020/0090519 A1* | 3/2020 | Ding | G08G 1/168 |
| 2022/0114893 A1* | 4/2022 | Kim | G08G 1/144 |

\* cited by examiner

APPARATUS FOR RECOGNIZING PARKING AREA FOR AUTONOMOUS PARKING AND METHOD THEREOF

CROSS-REFERENCE TO RELATED APPLICATION

This application claims priority from and the benefit of Korean Patent Application No. 10-2020-0160344, filed on Nov. 25, 2020, which is hereby incorporated by reference for all purposes as if set forth herein.

BACKGROUND

Field

Exemplary embodiments relate to technologies of recognizing a parking area for autonomous parking.

Discussion of the Background

With the development of technology, an autonomous parking technology for assisting a vehicle to park or exit a parking space has been introduced. For example, in an autonomous parking technology including a remote smart parking assist (RSPA) system, when a user pushes a button on a smart key, a vehicle may park or exit a parking space by itself without user involvement in the parking or the exiting of a parking space.

The above information disclosed in this Background section is only for enhancement of understanding of the background of the invention and, therefore, it may contain information that does not constitute prior art.

SUMMARY

To perform autonomous parking, there is a need for a vehicle (or a system of the vehicle) to recognize a parking area. In this case, the system may recognize a parking area using an ultrasonic wave, but, because an object, such as a previously parked vehicle, a wall, or a pillar, around a space where the vehicle wants to park is typically present, it may be impossible for the system using ultrasonic waves to perform autonomous parking in a parking area where there is no object around the space. A technology of recognizing a parking area using an image may recognize a space around a vehicle although there is no object around the vehicle, but it is difficult to detect a parking line designating a boundary of a parking space due to factors such as reflection of light or shadow effects. Particularly, a parking line indicating a parking area may fail to be accurately distinguished due to an auxiliary line that is not a parking space boundary or a merchandise loading mark that may exist on a parking lot.

The exemplary embodiments described herein have been made to solve the above-mentioned problems occurring in conventional autonomous vehicle parking technologies.

The technical problems to be solved by the present inventive concept are not limited to the aforementioned problems, and any other technical problems not mentioned herein will be clearly understood from the following description by those skilled in the art to which exemplary embodiments pertain.

According to an aspect, a vehicle parking assistance device may include an image sensing device, an artificial intelligence learning device, and a controller connected with the image sensing device and the artificial intelligence learning device. The controller may be configured to obtain an image using the image sensing device, detect at least one parking line pair in the obtained image, detect a parking area based on deep learning, detect a parking line based on the detected parking slot and the at least one detected parking line pair, detect an entrance point for the parking area, and generate parking information for autonomous parking based on the parking area and the entrance point.

According to another aspect, a vehicle parking assistance device may include an image sensing device, an artificial intelligence learning device, and a controller connected with the image sensing device and the artificial intelligence learning device. The controller may be configured to obtain an image using the image sensing device, detect a parking slot in the obtained image based on deep learning by means of the artificial intelligence learning device, detect a parking line and an entrance point in the obtained image, and generate parking information for autonomous parking based on the detected parking slot, the detected parking line, and the detected entrance point.

According to another aspect, a vehicle parking assistance device may include an image sensing device and a controller connected with the image sensing device. The controller may be configured to obtain an image using the image sensing device, detect a parking line in the obtained image, detect an entrance point included in a parking area based on an amount of change in a pixel value of the detected parking line, and generate information about the detected entrance point.

According to another aspect, a vehicle parking assistance device may include an image sensing device, an artificial intelligence learning device, and a controller connected with the image sensing device and the artificial intelligence learning device. The controller may be configured to obtain an image using the image sensing device, detect a parking line in the obtained image, detect a plurality of entrance point candidate groups based on an amount of change in a pixel value of the detected parking line, detect an entrance point having high confidence among the entrance point candidate groups based on deep learning using the artificial intelligence learning device, and generate information about the detected entrance point.

According to another aspect, a method may include obtaining an image, detecting at least one parking line pair in the obtained image, detecting a parking slot based on deep learning, detecting a parking area based on the detected parking slot and the at least one detected parking line pair, detecting an entrance point for the detected parking area, and generating parking information for autonomous parking based on the detected parking area and the entrance point.

According to another aspect, a method may include obtaining an image, detecting a parking slot in the obtained image based on deep learning, detecting a parking line and an entrance point in the obtained image, and generating parking information for autonomous parking based on the detected parking slot, the detected parking line, and the detected entrance point.

According to another aspect, a method may include obtaining an image, detecting a parking line in the obtained image, detecting an entrance point included in a parking area based on an amount of change in a pixel value of the detected parking line, and generating information about the detected entrance point.

According to another aspect, a method may include obtaining an image, detecting a parking line in the obtained image, detecting a plurality of entrance point candidate groups based on an amount of change in a pixel value of the detected parking line, detecting an entrance point having high confidence among the entrance point candidate groups based on deep learning, and generating information about the detected entrance point.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
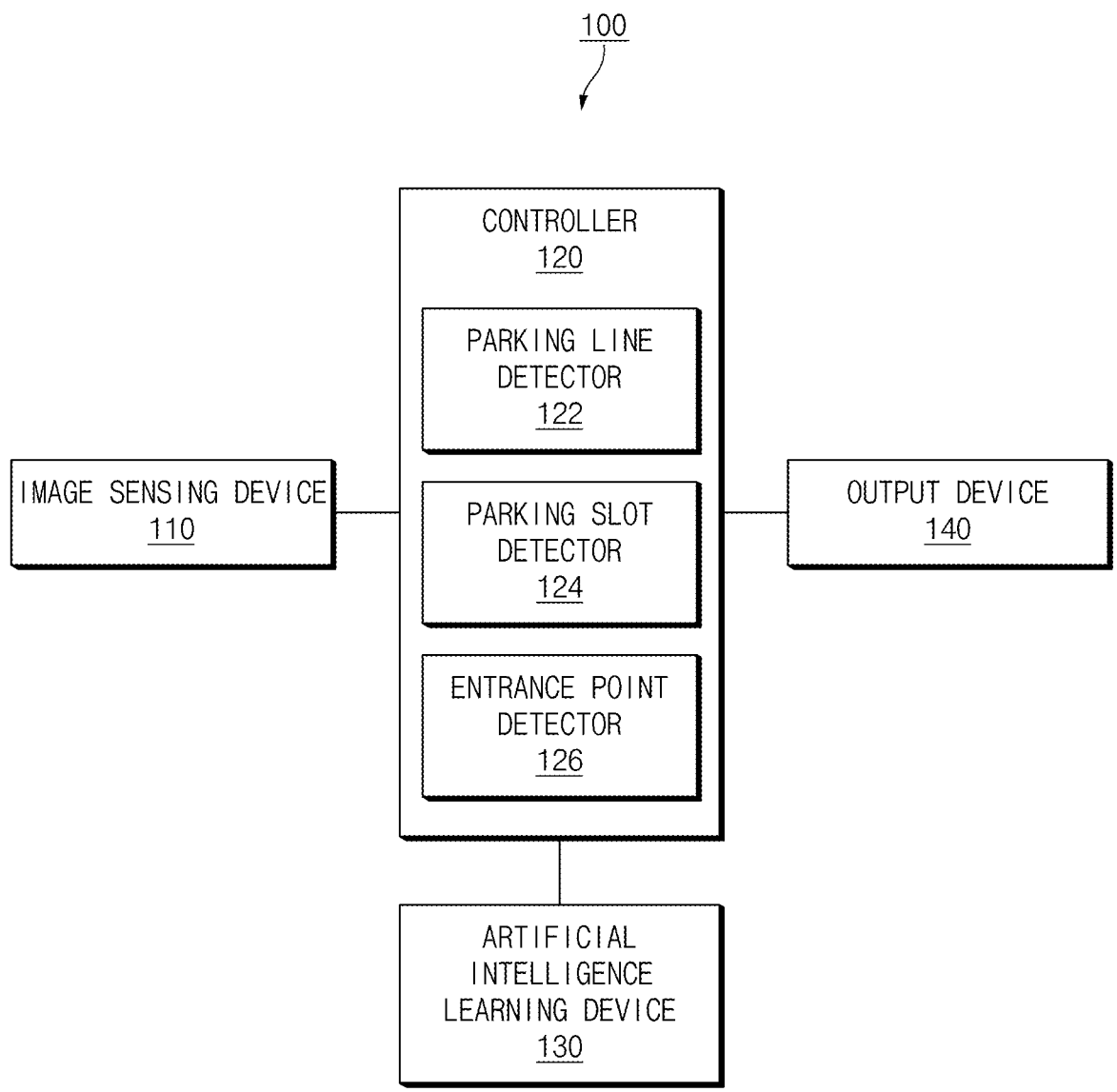
FIG. 1 is a functional block diagram of a vehicle system device according to various embodiments.

With regard to description of drawings, the same or similar denotations may be used for the same or similar components.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that the description of the various aspects is thorough, and will fully convey the scope of the invention to those skilled in the art.

Various embodiments and terms used therein are not intended to limit the technical features described herein to particular embodiments, and it should be construed as including various modifications, equivalents, or alternatives of a corresponding embodiment. With regard to description of drawings, similar denotations may be used for similar or related components. A singular form of a noun corresponding to an item may include one item or a plurality of the items, unless context clearly indicates otherwise. As used herein, each of the expressions "A or B," "at least one of A and B," "at least one of A or B," "A, B, or C," "at least one of A, B, and C," and "at least one of A, B, or C," may include any and all combinations of one or more of the items listed together with a corresponding expression among the expressions. Terms as "1st" and "2nd," or "first" and "second" may be used to distinguish a corresponding component from another, and do not limit the components in another aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" used in various embodiments may include a unit implemented in hardware, software, or firmware, and may be interchangeably used with other terms, such as "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Various embodiments may be implemented as software (e.g., a program) including instructions that are stored in a machine-readable storage medium (e.g., an internal memory or an external memory). For example, the machine may invoke at least one of one or more instructions stored in the storage medium and may execute the invoked instruction. This may allow the machine to be operated to perform at least one function depending on the at least one invoked instruction. The one or more instructions may contain a code made by a compiler or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semi permanently stored in the storage medium and where data is temporarily stored in the storage medium.

According to an embodiment, a method according various embodiments disclosed herein may be included and provided in a computer program product. The computer program product may be traded as commodities between sellers and buyers. The computer program product may be distributed in the form of a machine-readable storage medium (e.g., a compact disc read only memory (CD-ROM)) or may be distributed (e.g., downloaded or uploaded) directly or online through an application store or between two user devices. When distributed online, at least part of the computer program product may be at least temporarily stored in a machine-readable storage medium, such as a memory of the manufacturer's server, a server of the application store, or a relay server, and may be temporarily generated.

According to various embodiments, each (e.g., a module or program) of the above-mentioned components may include a single entity or a plurality of entities, and some of the plurality of entities may be separately arranged in another component. According to various embodiments, one or more components of the above-mentioned components or operations may be omitted, or one or more other components or operations may be added. Alternatively or additionally, the plurality of components (e.g., modules or programs) may be integrated into one component. In such a case, the integrated component may one or more functions of each of the plurality of components to be the same or similar to being performed by a corresponding component of the plurality of components before the integration. According to various embodiments, operations performed by modules, programs, or other components may be carried out sequentially, in parallel, repeatedly, or heuristically, or at least one or more of the operations may be executed in a different order or omitted, or other operations may be added.

FIG. 1 is a functional block diagram of a vehicle system device 100 according to various embodiments.

Referring to FIG. 1, the vehicle system device 100 may refer to a system device loaded onto a vehicle. The vehicle system device 100 may perform the overall function (e.g., autonomous driving or autonomous parking) of the vehicle. The vehicle system device 100 may include an image sensing device 110, a controller 120, an artificial intelligence learning device 130, and an output device 140. According to other embodiments, the vehicle system device 100 may exclude at least some (e.g., the output device 140) among the components shown in FIG. 1 or may further include another component (e.g., a communication interface or a memory) which is not shown in FIG. 1. The components included in the vehicle system device 100 may refer to software (e.g., a program) implemented by instructions as well as hardware components.

The image sensing device 110 may be used to obtain an image. For example, the image sensing device 110 may be a camera including at least one of one or more lenses, an image sensor, an image signal processor, or a flash imaging device. According to an embodiment, the image sensing device 110 may obtain an image surrounding the vehicle. In this case, the image sensing device 110 may include 4-channel or more cameras mounted on the vehicle. The image surrounding the vehicle may be, for example, a surround view, 360-degree image of an area around the vehicle. The vehicle system device 100 may detect a parking area (or a parking slot) and an entrance point for parking the vehicle in the parking slot, based on the obtained image data or the surround view image.

The controller 120 may execute, for example, software (e.g., a program) to control at least one other component (e.g., a hardware or software component) of the vehicle system device 100 connected to the controller 120 and may perform a variety of data processing tasks or calculations. According to an embodiment, as at least a part of data processing or calculation performed, the controller 120 may store commands or data received from another component (e.g., the image sensing device 110, the artificial intelligence learning device 130, or the output device 140) in a volatile memory, may process the commands or data stored in the volatile memory, and may store resultant data in a nonvolatile memory. According to an embodiment, the controller 120 may include a main processor (e.g., a central processing unit or an application processor) or an auxiliary processor (e.g., a graphic processing unit, an image signal processor, a sensor hub processor, a communication processor) operable independently or together with each other. For example, when the controller 120 includes the main processor and the auxiliary processor, the auxiliary processor may be configured to use lower power than the main processor or specialize in a specified function. The auxiliary processor may be implemented independently of the main processor or as a part thereof.

According to embodiments, the controller 120 may perform the overall function of the vehicle system device 100 for outputting parking information. For example, the controller 120 may obtain an image by way of the image sensing device 110 and may detect a plurality of parking line candidate groups in the obtained image. The controller 120 may detect at least one parking line pair among the plurality of parking line candidate groups. The controller 120 may detect a parking slot in an image obtained based on deep learning by way of the artificial intelligence learning device 130. The controller 120 may detect a parking area based on the at least one detected candidate parking line pair and the detected parking slot and may detect an entrance point of the detected parking area. The controller 120 may generate parking information for autonomous parking based on the detected parking area and the detected entrance point and may output the generated parking information through the output device 140.

For another example, the controller 120 may obtain an image by way of the image sensing device 110 and may preprocess image data of the obtained image. The controller 120 may detect a parking slot in the image based on deep learning by way of the artificial intelligence learning device 130. The controller 120 may detect a parking line in the image. The controller 120 may detect an entrance point of the parking area based on the detected parking line and the detected parking slot. The controller 120 may generate parking information for autonomous parking based on the detected parking slot, the detected parking line, and the detected entrance point and may output the generated parking information through the output device 140.

According to embodiments, the controller 120 may perform the overall function of the vehicle system device 100 for outputting information about the entrance point. For example, the controller 120 may obtain an image by way of the image sensing device 110 and may detect a parking line in the obtained image. The controller 120 may detect an entrance point for a parking area based on an amount of change in a pixel value of the detected parking line. The controller 120 may generate information about the detected entrance point and may output the generated information through the output device 140.

For another example, the controller 120 may obtain an image by way of the image sensing device 110 and may detect a parking line in the obtained image. The controller 120 may detect an entrance point candidate group for a parking area based on an amount of change in a pixel value of the detected parking line. The controller 120 may detect an entrance point having high confidence based on deep learning using the artificial intelligence learning device 130. The controller 120 may output information about the detected entrance point.

The above-mentioned example describes that the controller 120 performs each operation for generating parking information in an integrated manner. However, the vehicle system device 100 according to embodiments may separately include a parking line detector 122 for detecting a parking line, a parking slot detector 124 for detecting a parking slot, and an entrance point detector 126 for detecting an entrance point. Each of these components may be a hardware device or software (a program) stored in a memory. As the respective components may operate separately without operating as one module, a change in algorithm, learning of the algorithm, or performance enhancement of the algorithm may be separately performed.

The artificial intelligence learning device 130 may include a hardware structure specialized in processing an artificial intelligence model, for example, a neural processing unit (NPU). For another example, the artificial intelligence learning device 130 may be present as a separate program in a memory (not shown) of the vehicle system device 100. The artificial intelligence model may be generated by machine learning. Such learning may be performed in the vehicle system device 100 itself in which artificial intelligence is performed or may be performed by way of a separate server. A learning algorithm may include, for example, but is not limited to, supervised learning, unsupervised learning, semi-supervised learning, or reinforcement learning. The artificial intelligence model may include a plurality of artificial neural network layers. An artificial neural network may be, but is not limited to, one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, two or more combinations thereof. Additionally or alternatively, the artificial intelligence model may include a software structure, other than a hardware structure.

According to embodiments, the artificial intelligence learning device 130 may learn the image for the parking slot by way of a deep learning classifier and may distinguish the parking slot in the surround view image depending to the learned result. For another example, the artificial intelligence learning device 130 may learn an image for the entrance point by way of the deep learning classifier and may classify one entrance point among entrance point candidate groups depending on the learned result.

The output device 140 may include a hardware component for visually or audibly providing information about the parking information or the entrance point. For example, the output device 140 may include a display, a hologram device, or a projector, and a control circuit for controlling the corresponding device. For another example, the output device 140 may include an audio device (e.g., a speaker) capable of converting a sound into an electrical signal or converting an electrical signal into a sound.

Figure 2:
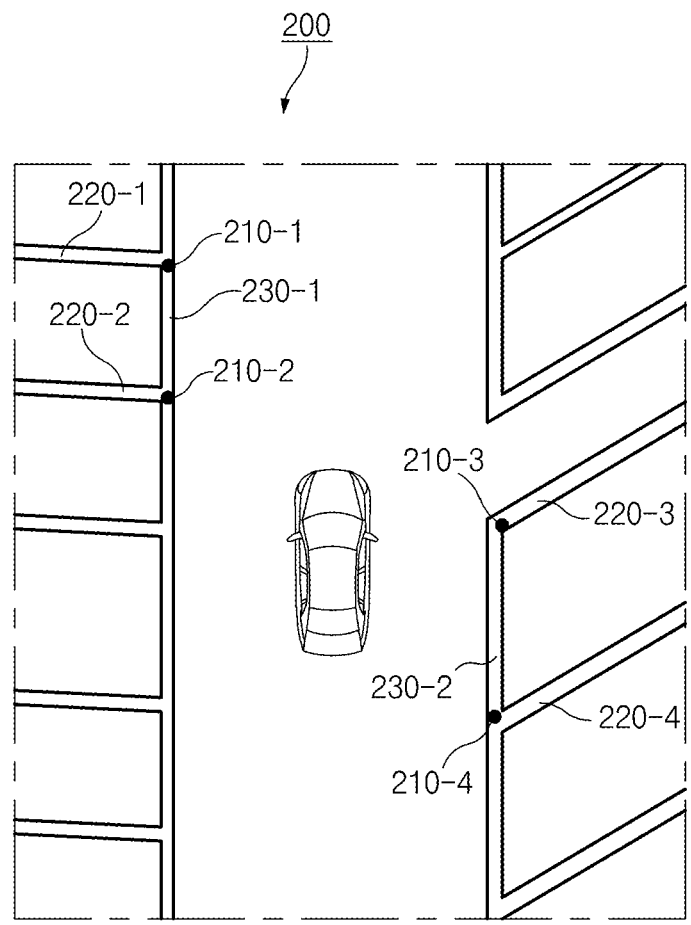
FIG. 2 illustrates parameters configuring parking information according to various embodiments.

FIG. 2 illustrates parameters configuring parking information according to various embodiments.

Referring to FIG. 2, a vehicle system device 100 of FIG. 1 may obtain an image 200 using an image sensing device 110 of FIG. 1. The image 200 may include, for example, a surround view, 360-degree image that surrounds a vehicle. To perform autonomous parking, the vehicle system device 100 may use at least one information among the following types of information: a) an entrance point (e.g., 210-1, 210-2, 210-3, or 210-4), b) a parking line (e.g., 220-1, 220-2, 220-3, or 220-4), or c) a parking slot (e.g., 230-1 or 230-2).

The entrance point may be used to control autonomous parking. FIG. 2 illustrates that the entrance point is represented as a point where the parking line and the parking slot meet, but the entrance point according to various embodiments may be an area including a portion of the parking area. The entrance point may include location coordinates (e.g., x and y coordinates) and direction information (e.g., an angle). For example, first information among the direction information of the entrance point may correspond to a direction of a parking line, and second information among the direction information of the entrance point may correspond to a direction of a parking slot. Thus, the vehicle system device 100 may determine a type (or form) of a parking area depending on a type (or form) of the entrance point. An example of the type of the entrance point will be described with reference to FIG. 11.

Figure 3:
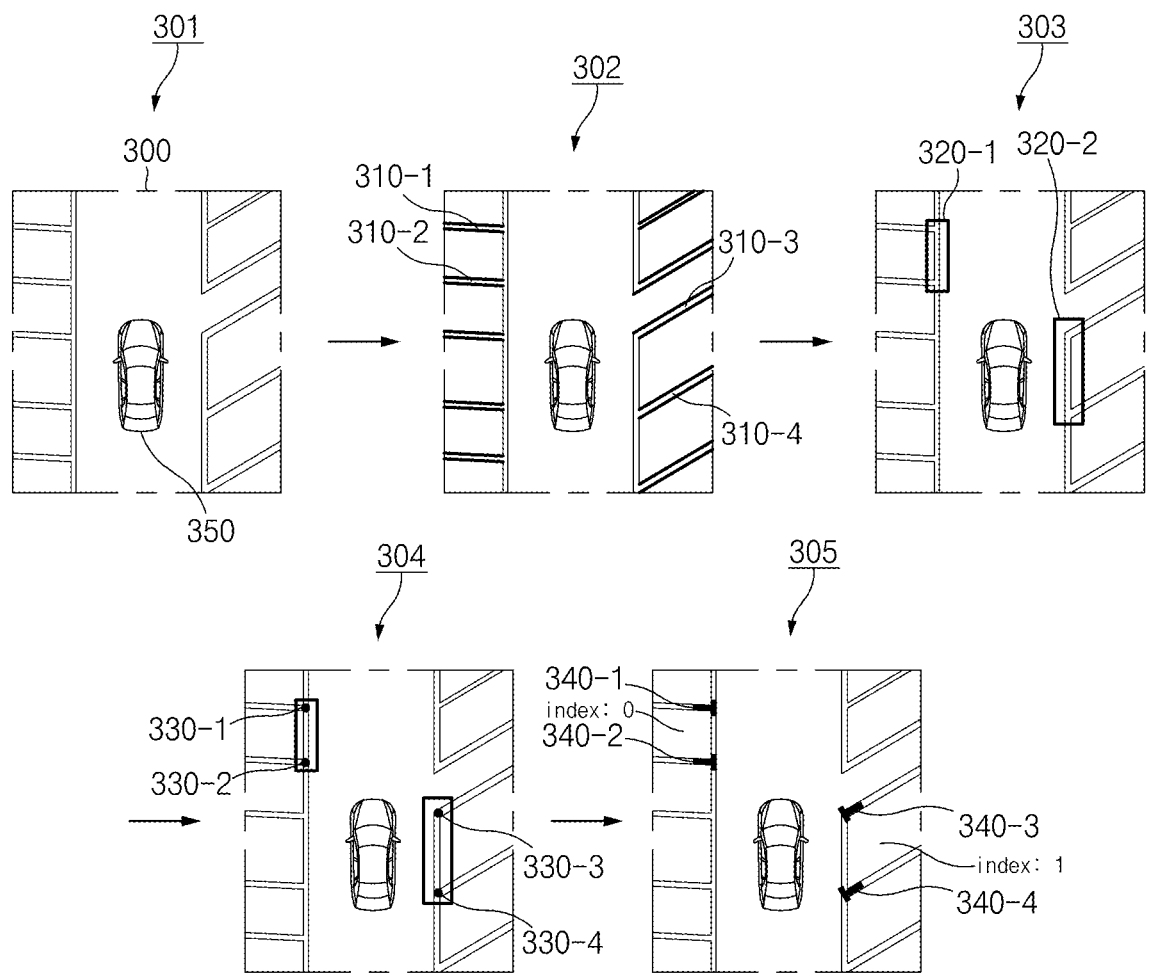
FIG. 3 illustrates an operation for generating parking information according to various embodiments.
Figure 4:
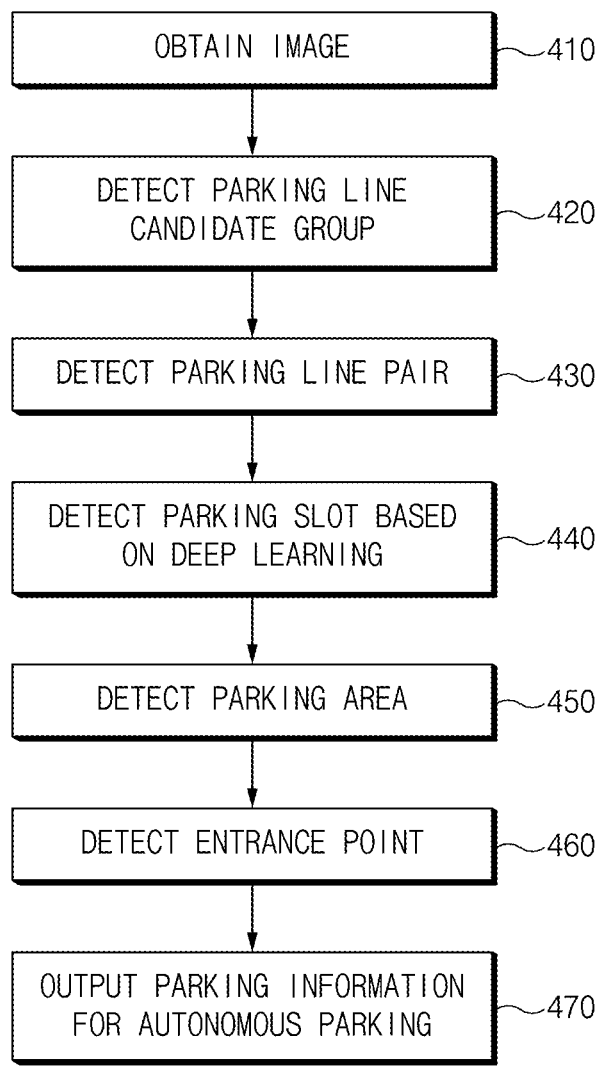
FIG. 4 illustrates an operational flowchart of a vehicle system device for outputting parking information according to various embodiments.

FIGS. 3 and 4 illustrate an operation for generating parking information according to an embodiment.

Referring to FIG. 3, in operation 301, a vehicle system device 100 of FIG. 1 may obtain a surround view, 360-degree image 300 that surrounds a vehicle 350 using an image sensing device 110 of FIG. 1. Embodiments where the vehicle system device 100 uses the surround view, 360-degree image 300 are described for convenience of description, but the form of the image obtained by the image sensing device 110 is not limited to a surround view form.

In operation 302, the vehicle system device 100 may detect at least one parking line pair in the image 300. The parking line pair may refer to, for example, two parking lines forming one parking slot. For example, the parking line 310-1 and the parking line 310-2 may form one parking line pair, and the parking line 310-3 and the parking line 310-4 may form another parking line pair. FIG. 3 illustrates an example of detecting only two parking line pairs, but the number of parking lines and the number of parking line pairs, which are detected by the vehicle system device 100, are not limited thereto.

According to an embodiment, the vehicle system device 100 may detect a plurality of parking line candidate groups in the image 300 to detect a parking line pair. For example, a controller 120 of FIG. 1 may perform filtering (e.g., Gaussian filtering) to remove noise due to raw data or the surround view image obtained by way of the image sensing device 110 and may extract edge data from the filtered image. The controller 120 may determine a point determined as being a line in the image 300 as a line feature point. The line feature point may include, for example, location information (e.g., x and y coordinates) and direction information based on a gradient, in the image 300. The controller 120 may perform line fitting for the determined line feature point. For example, the controller 120 may extract lines by clustering feature points, each of which has a similar direction and location, among the determined line feature points. The extracted lines (i.e., parking lines) may include both end points (e.g., x and y coordinates) and direction information. The controller 120 may determine two lines, which are parallel to each other and are separated from each other by a specified interval, among a plurality of parking line candidate groups determined through the filtering, the feature point detection, and the line fitting as a parking line pair.

In operation 303, the vehicle system device 100 may detect at least one parking slot (e.g., 320-1 or 320-2) based on deep learning. The parking slot may be, for example, a space between parking line pairs, which may refer to an entrance section of a parking area. According to an embodiment, the controller 120 may learn various types of parking slots by way of an artificial intelligence learning device 130 of FIG. 1 and may detect an area corresponding to the parking slot in the image 300 based on the learned result. The parking line pair and the parking slot may form one parking area (or a parking area).

In operation 304, the vehicle system device 100 may detect an entrance point (e.g., 330-1, 330-2, 330-3, or 330-4). The entrance point may refer to a point where an end point of the parking slot and an end point of the parking line pair meet. The entrance point may be represented as, for example, location coordinates (e.g., x and y coordinates) in the image 300. The vehicle system device 100 may control autonomous parking using a location of the entrance point.

In operation 305, the vehicle system device 100 may output parking information for autonomous parking. The parking information may include at least one information among, for example, identification information (e.g., index 0 or index 1) about a parkable area, a location and an angle of the entrance point (e.g., 340-1, 340-2, 340-3, or 340-4), or a type (e.g., a parallel type, a perpendicular type, a diagonal type, or a stepped type) of a parking slot.

FIG. 4 illustrates an operational flowchart of a vehicle system device for outputting parking information according to an embodiment. In the description below, operations included in the operational flowchart may be performed by a vehicle system device 100 of FIG. 1 or may be performed by components included in the vehicle system device 100. For example, a controller 120 of the vehicle system device 100 may control other components (e.g., an image sensing device 110, an artificial intelligence learning device 130, and the output device 140) to perform operations of the operational flowchart.

Referring to FIG. 4, in operation 410, the controller 120 may obtain an image using the image sensing device 110. The obtained image may include, for example, a surround view, 360-degree image of that surrounds a vehicle including the vehicle system device 100.

In operation 420, the controller 120 may detect a plurality of parking line candidate groups in the obtained image. The parking line may refer to, for example, a line having a specified direction in the image.

In operation 430, the controller 120 may detect a parking line pair in the obtained image. For example, the controller 120 may determine two parking lines, which are parallel to each other and have a specified interval between them, among the plurality of parking line candidate groups as a parking line pair. According to an embodiment, the controller 120 may perform operation 420 and operation 430 at the same time without separately performing operation 420 and operation 430. Operation 420 and operation 430 may be performed by a parking line detector 122 of FIG. 1.

In operation 440, the controller 120 (e.g., a parking slot detector 124 of FIG. 1) may detect a parking slot in the image based on deep learning. For example, the controller 120 may extract an area between the detected parking line pairs and may classify the extracted area using an artificial intelligence learning device 130 of FIG. 1. The classification may be performed by, for example, a DNN-based deep learning classifier. The controller 120 may determine whether the area extracted through the classification is a parking slot. When the area extracted through the classification corresponds to the parking slot, the controller 120 may determine what a type of the parking slot is. The type of the parking slot may include, for example, but is not limited to, a parallel type, a perpendicular type, a diagonal type, and a stepped type.

In operation 450, the controller 120 may detect a parking area. For example, the controller 120 may determine the parking area based on the parking slot and a parking line corresponding to the parking slot among the parking line candidate groups (or parking line pairs).

In operation 460, the controller 120 (e.g., an entrance point detector 126 of FIG. 1) may detect an entrance point of the determined parking area. The entrance point may be represented as, for example, location coordinates and direction information. The direction information of the entrance point may correspond to a direction of the parking line pair. According to an embodiment, the entrance point may be determined together when the parking area is detected. In this case, the controller 120 may omit operation 460.

In operation 470, the controller 120 may output parking information for autonomous parking. For example, the controller 120 may deliver the parking information to another component of the vehicle system device 100 for autonomous driving. For another example, the controller 120 may display the parking information on an output device 140 of FIG. 1 such that a user may identify the parking area and the entrance point.

Figure 5:
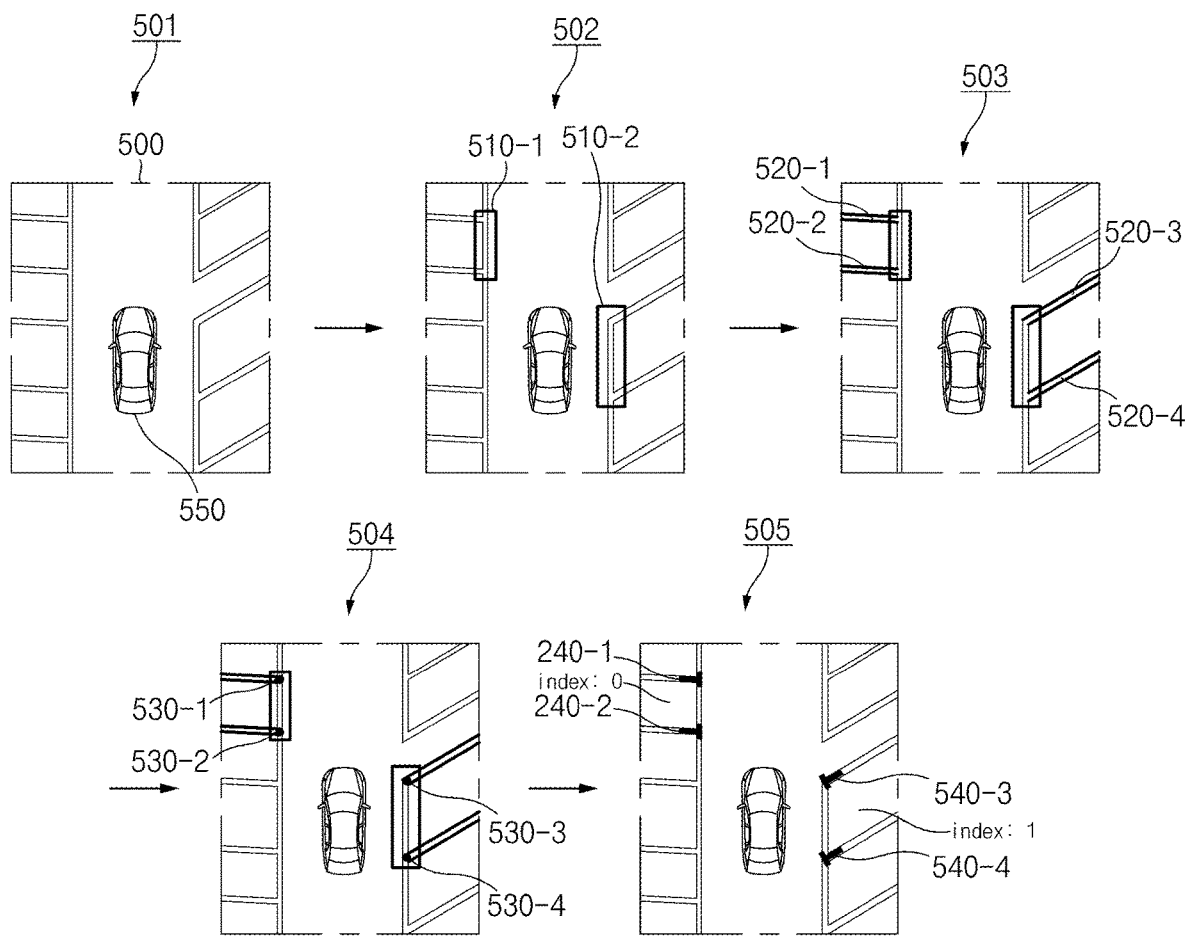
FIG. 5 illustrates another operation for generating parking information according to various embodiments.
Figure 6:
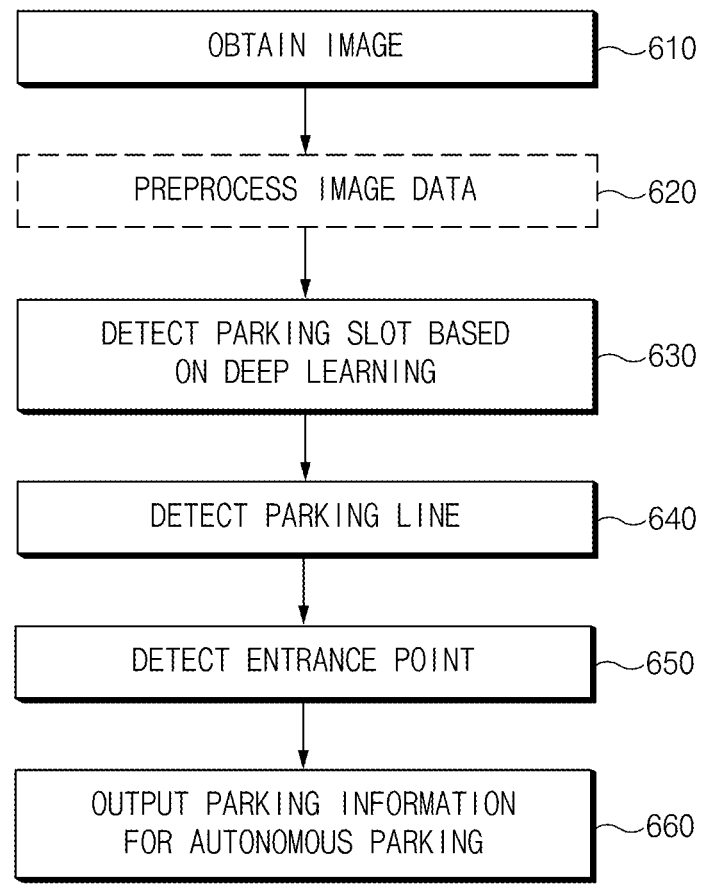
FIG. 6 illustrates another operational flowchart of a vehicle system device for outputting parking information according to various embodiments.

FIGS. 5 and 6 illustrate an operation for generating parking information according to another embodiment.

Referring to FIG. 5, in operation 501, a vehicle system device 100 of FIG. 1 may obtain an image 500 including a vehicle 550 using an image sensing device 110 of FIG. 1. The image 500 may be, for example, a surround view, 360-degree image that surrounds the vehicle 550.

In operation 502, the vehicle system device 100 may detect at least one parking slot (e.g., 510-1 or 510-2) based on deep learning. The parking slot may refer to, for example, a section a vehicle enters in a parking area (or a parking slot). According to an embodiment, a controller 120 of FIG. 1 may learn various types of parking slots by way of an artificial intelligence learning device 130 of FIG. 1 and may detect an area corresponding to the parking slot and a type of the parking slot indicated by the area in the image 500 based on the learned result. The controller 120 may generate parking slot information indicating the detected type of the parking slot and location information (e.g., x and y coordinates).

In operation 503, the vehicle system device 100 may detect at least one parking line (e.g., 520-1, 520-2, 520-3, or 520-4) in the image 500. For example, the controller 120 may perform filtering (e.g., Gaussian filtering) to remove noise due to raw data or the surround view image obtained by way of the image sensing device 110 and may extract edge data from the filtered image. The controller 120 may determine a point determined as being a line in the image 500 as a line feature point. The line feature point may include, for example, location information (e.g., x and y coordinates) and direction information based on a gradient, in the image 500. The controller 120 may perform line fitting for the determined line feature point. For example, the controller 120 may extract lines by clustering feature points, each of which has a similar direction and location, among the determined line feature points. The extracted lines (i.e., parking lines) may include both end points (e.g., x and y coordinates) and direction information. The controller 120 may determine two lines, which are parallel to each other and are separated from each other at a specified interval, among the plurality of parking lines determined through the filtering, the feature point detection, and the line fitting as a parking line pair (e.g., 520-1 and 520-2, or 520-3 and 520-4). The parking line pair and the parking slot may form one parking area, which is designated by its respective pair of parking lines.

In operation 504, the vehicle system device 100 may detect an entrance point (e.g., 530-1, 530-2, 530-3, or 530-4) for the parking slot. The entrance point may refer to a point where an end point of the parking slot and an end point of the parking line pair meet. The entrance point may be represented as, for example, location coordinates (e.g., x and y coordinates) in the image 500. The vehicle system device 100 may control autonomous parking using a location of the entrance point.

In operation 505, the vehicle system device 100 may output parking information for autonomous parking. The parking information may include at least one information among, for example, identification information (e.g., index 0 or index 1) about a parkable area, a location and an angle of the entrance point (e.g., 540-1, 540-2, 540-3, or 540-4), or a type (e.g., a parallel type, a perpendicular type, a diagonal type, or a stepped type) of the parking slot.

FIG. 6 illustrates an operational flowchart of a vehicle system device for outputting parking information according to another embodiment. In the description below, operations included in the operational flowchart may be performed by a vehicle system device 100 of FIG. 1 or may be performed by components included in the vehicle system device 100. For example, a controller 120 of the vehicle system device 100 may control other components (e.g., an image sensing device 110, an artificial intelligence learning device 130, and an output device 140 of FIG. 1) to perform operations of the operational flowchart.

Referring to FIG. 6, in operation 610, the controller 120 may obtain an image using the image sensing device 110. The obtained image may include, for example, a surround view, 360-degree image that surrounds a vehicle including the vehicle system device 100.

In operation 620, the controller 120 may preprocess image data. The image data may refer to, for example, raw data of the image obtained in operation 610 of FIG. 6 or data of the surround view image. For example, the controller 120 may filter the image data to remove noise in the image data. The controller 120 may perform a task for extracting edge data from the filtered image data.

In operation 630, the controller 120 (e.g., a parking slot detector 124 of FIG. 1) may detect a parking slot in the image based on deep learning. For example, the controller 120 may recognize an area corresponding to the parking slot in the image using the artificial intelligence learning device 130 and may classify a type of the parking slot indicated by the recognized area. The classification may be performed by, for example, a DNN-based deep learning classifier. The type of the parking slot may include, for example, but is not limited to, a parallel type, a perpendicular type, a diagonal type, and a stepped type.

In operation 640, the controller 120 (e.g., a parking line detector 122 of FIG. 1) may detect a parking line in the obtained image. The parking line may refer to, for example, a line having a specified direction in the image. The controller 120 may extract feature points from the obtained image and may detect a parking line through line fitting for the extracted feature points. The controller 120 may determine two parking lines, which are parallel to each other and have a specified interval by which these parking lines are separated from each other, among the plurality of detected parking lines as a parking line pair.

According to another embodiment, the controller 120 or the parking line detector 122 may detect a parking line based on the detected parking slot. For example, the controller 120 may detect a parking line extended from the parking slot, depending on the type of the parking slot. In this case, the direction of the parking line may be based on the detected type of the parking slot.

In operation 650, the controller 120 (e.g., an entrance point detector 126 of FIG. 1) may detect an entrance point. The entrance point may be represented as, for example, location coordinates and direction information. The direction information of the entrance point may correspond to a direction of the parking line. In an embodiment, the controller 120 may detect an entrance point using at least one of the detected parking slot or the detected parking line. For example, the entrance point may be a point where the parking slot and the parking line meet. For another example, the entrance point may be an end point of the parking slot or the parking line meet.

In operation 660, the controller 120 may output parking information for autonomous parking. For example, the controller 120 may deliver the parking information to another component of the vehicle system device 100 for autonomous driving. For another example, the controller 120 may display the parking information on an output device 140 of FIG. 1 such that a user may identify the parking slot and the entrance point.

Figure 7:
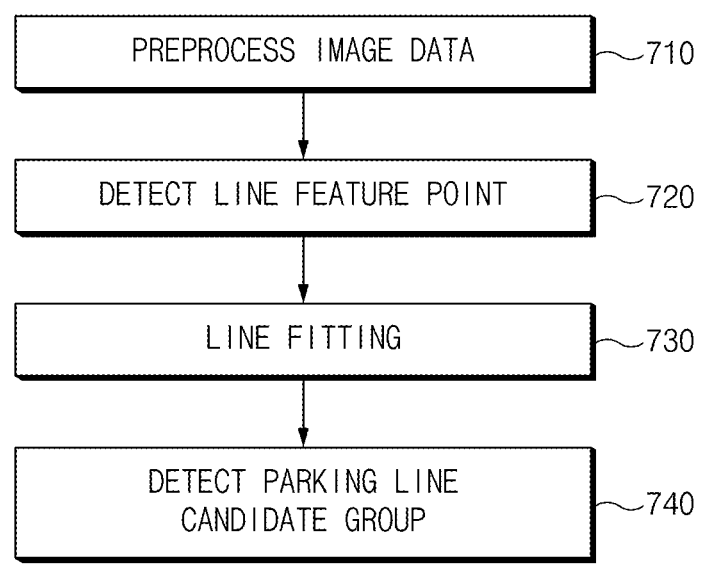
FIG. 7 illustrates an operational flowchart of a vehicle system device for detecting a parking line candidate group according to various embodiments.

FIG. 7 illustrates an operational flowchart of a vehicle system device for detecting a parking line candidate group according to various embodiments. Operations shown in FIG. 7 may be performed as an example of, for example, operation 420 of FIG. 4 or operation 640 of FIG. 6. Operations 720 to 740 among the operations shown in FIG. 7 may be performed by a parking line detector 122 of FIG. 1.

Referring to FIG. 7, in operation 710, a controller 120 of FIG. 1 may preprocess image data. The image data may refer to, for example, raw data of an image obtained in operation 310 of FIG. 3 or operation 610 of FIG. 6 or data of a surround view image. For example, the controller 120 may filter the image data to remove noise in the image data. The controller 120 may perform a task for extracting edge data from the filtered image data.

In operation 720, the controller 120 may detect a line feature point based on the preprocessed image data. The line feature point may be plural in number. The line feature point may include location information and direction information.

In operation 730, the controller 120 may perform line fitting for the detected line feature point. For example, the controller 120 may generate a line by clustering feature points, each of which has a similar direction and location, among the determined line feature points. The generated line may include location coordinates (e.g., x and y coordinates) and direction information (e.g., an angle) for both end points.

In operation 740, the controller 120 may detect a parking line candidate group in the image through the generated line. For example, the controller 120 may determine lines, each of which has a specified length or is parallel to another line, among the previously determined lines as a parking line candidate group.

Figure 8:
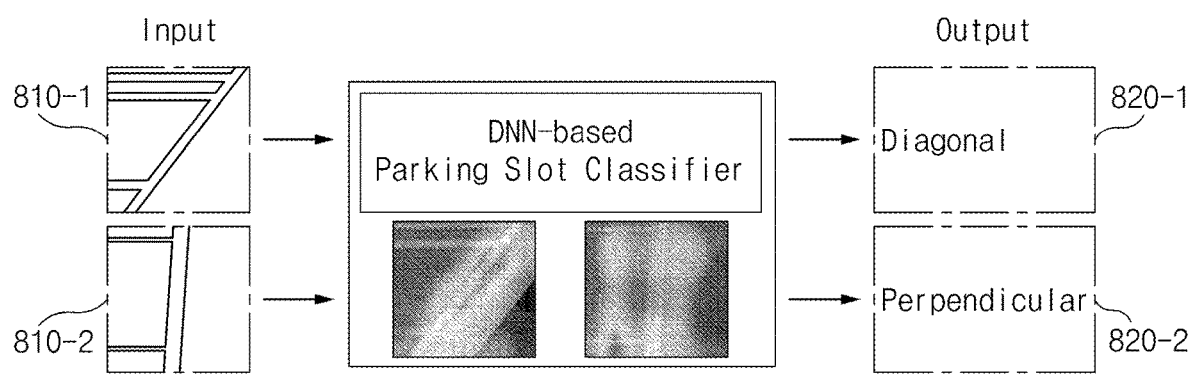
FIG. 8 illustrates an operation for detecting a parking slot based on a deep learning classifier according to various embodiments.

FIG. 8 illustrates an operation for detecting a parking slot based on a deep learning classifier according to various embodiments.

Referring to FIG. 8, a vehicle system device 100 (e.g., a controller 120) of FIG. 1 may use an image (e.g., 810-1 or 810-2) including a parking slot as an input of a DNN-based parking slot classifier. The image including the parking slot may be extracted from an image (e.g., 200 of FIG. 2) previously obtained by an image sensing device 110 of FIG. 1 or may be obtained additionally by the image sensing device 110 after the vehicle system device 100 detects a parking line candidate group (or a parking line pair).

Because the DNN-based parking slot classifier is in a state learned through an image including various types of parking slots, it may identify whether the input image includes a parking slot and may identify whether the input image indicates any type of parking slot when the input image includes the parking slot. For example, when the first image 810-1 is input to the DNN-based parking slot classifier, the controller 120 (or an artificial intelligence learning device 130 of FIG. 1) may recognize that the first image 810-1 indicates a parking slot and may recognize that a type of the recognized parking slot indicates a diagonal type 820-1. As a similar example, when the second image 810-2 is input to the DNN-based parking slot classifier, the controller 120 may recognize that the second image 810-2 indicates a parking slot and may recognize that a type of the recognized parking slot indicates a perpendicular type 820-2.

Figure 9A:
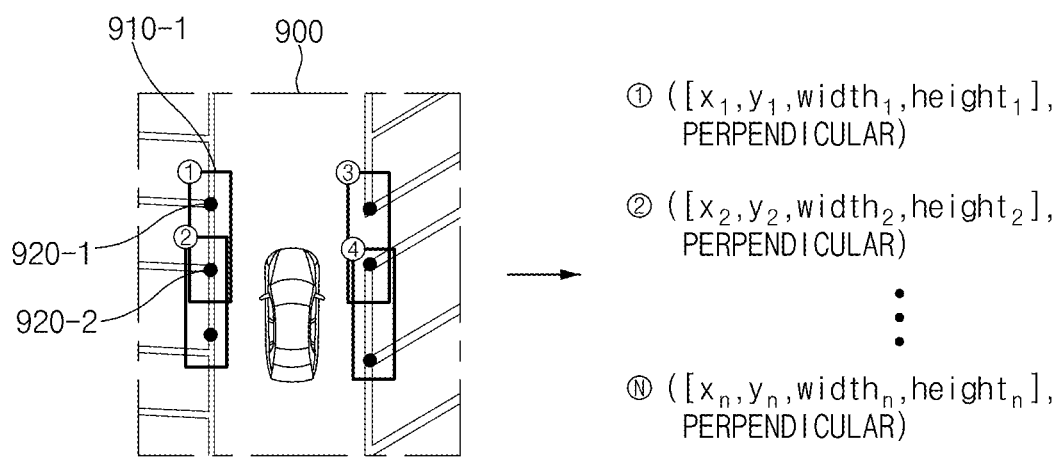
FIG. 9A illustrates an operation for obtaining various types of parking slot images according to various embodiments.
Figure 9B:
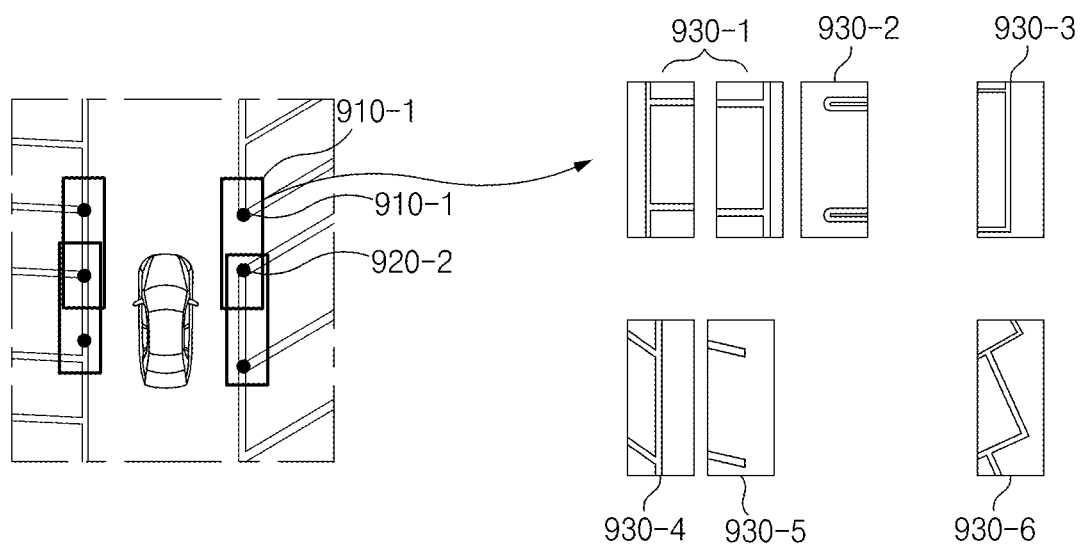
FIG. 9B illustrates an operation for obtaining various types of parking slot images according to various embodiments.
Figure 10:
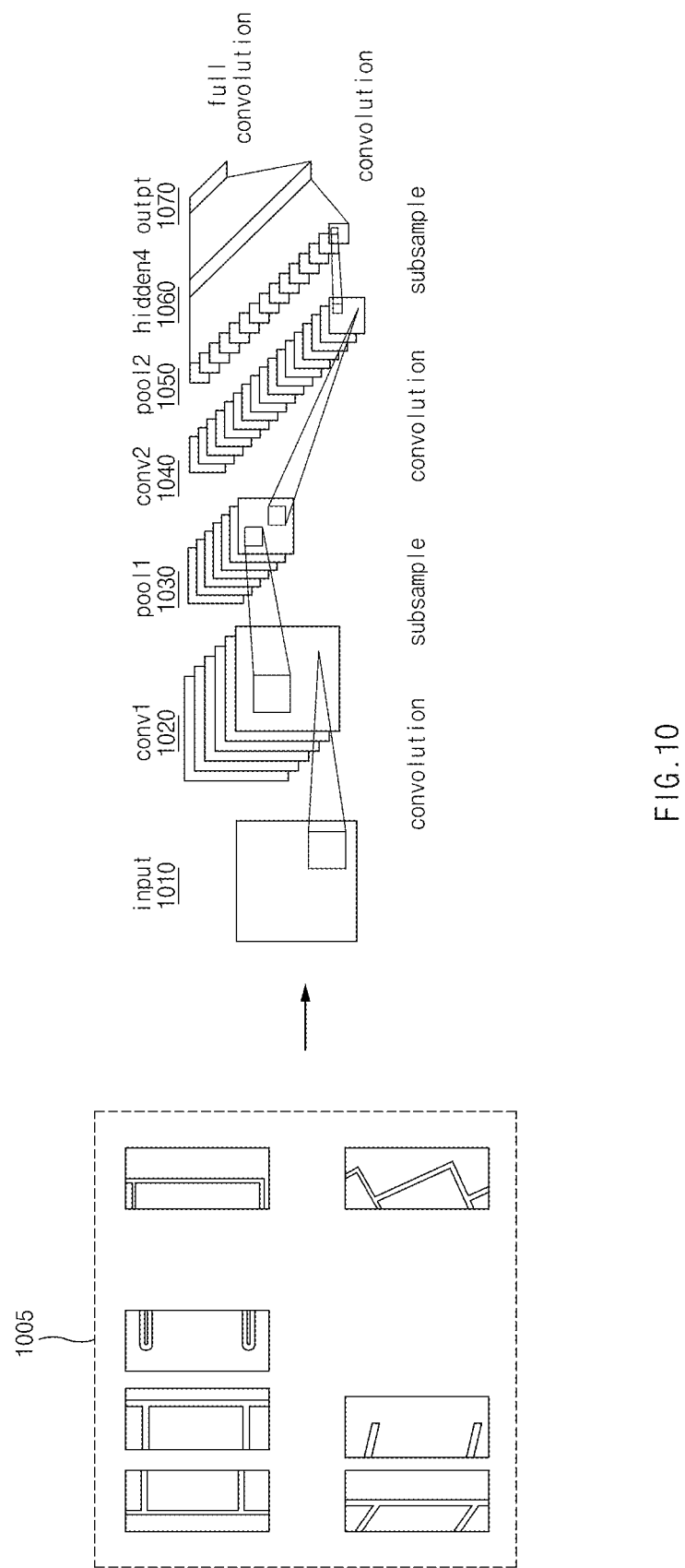
FIG. 10 illustrates an operation for learning a parking slot image by way of a deep learning classifier according to various embodiments.

FIGS. 9A, 9B, and 10 illustrate an operation for learning a parking slot according to various embodiments. FIGS. 9A and 9B illustrate an operation for obtaining a parking slot image. FIG. 10 illustrates an operation for learning a parking slot image by way of a deep learning classifier. A method for learning a parking slot image, which will be described below, may be performed by way of an artificial intelligence learning device 130 of a vehicle system device 100 of FIG. 1 or may be performed by way of a separate server linked with the vehicle system device 100. In this case, the vehicle system device 100 may detect a parking slot by receiving a learned result from the server.

Referring to FIG. 9A, the vehicle system device 100 (e.g., the artificial intelligence learning device 130) may obtain an image 900 including at least one parking slot by way of an image sensing device 110 of FIG. 1. The artificial intelligence learning device 130 may obtain a plurality of images, each of which includes a parking slot, while changing a place (e.g., a parking lot), weather, and a type of a parking slot. The artificial intelligence learning device 130 may generate a local patch image to be used for learning in the image including the parking slot. In an embodiment, the artificial intelligence learning device 130 may generate a plurality of local patch images including a parking slot (e.g., 910-1) through pairing of entrance points (e.g., 920-1 and 920-2). The local patch image may include information about location coordinates (e.g., x and y), a width, a height, or a type (e.g., a perpendicular type, a parallel type, a diagonal type, a stepped type, and an open/closed type) of a parking slot.

Referring to FIG. 9B, the type of the parking slot may include, for example, but is not limited to, a closed perpendicular type (930-1), an open perpendicular type (930-2), a closed parallel type 930-3, a closed diagonal type 930-4, an open diagonal type 930-5, and a stepped type 930-6.

Referring to FIG. 10, the artificial intelligence learning device 130 may learn a local patch image 1005 by way of a deep learning classifier to accurately recognize a type of a parking slot in various situations (e.g., a place, weather, and the like). The artificial intelligence learning device 130 may first determine whether the local patch image 1005 obtained before learning is a parking slot and may then perform learning when the local patch image 1005 corresponds to the parking slot. The deep learning classifier may learn a parking slot based on various types of artificial intelligence models. For example, the deep learning classifier may enhance accuracy of image recognition by learning a type of a parking slot using a CNN structure. For example, an input 1010 of the deep learning classifier may be local patch images indicating various types of parking slots and a parking slot type indicated by each image. The deep learning classifier may repeatedly perform convolution and sub-sampling for data of the input 1010. The convolution may be understood as an operation of applying a mask to an input image, multiplying a weight of the mask for each pixel value of the input image, and setting the sum thereof to a pixel value of an output image. The input 1010 of the deep learning classifier may be output as a plurality of images 1020 through the convolution. The plurality of images 1020 may be referred to as a feature map. The sub-sampling may be an operation of reducing a size of a screen, which may be referred to as a pooling operation. The sub-sampling may be understood as an operation of reducing a feature map of an M×M size to a feature map of an N×N size. A plurality of images 1030, each of which has the reduced size through the sum-sampling, may be generated. When the above-mentioned convolution and the above-mentioned sub-sampling are repeated, the image may increase in number and the image may decrease in size (1040 and 1050). The reduced images may have only features. The feature may be to distinguish, for example, a type of a parking slot, which may include a location of an entrance point, a direction of the entrance point, an angle of the entrance point, whether the entrance point is open/closed, or the like. The deep learning classifier may learn a plurality of images 1050 generated through the convolution and the sub-sampling by applying the plurality of images 1050 to at least one hidden layer 1060 (e.g., a DNN). The deep learning classifier may classify a type of a parking slot in an image obtained thereafter using a learned result 1070.

FIGS. 11 to 18 illustrate an operation for outputting information about an entrance point according to various embodiments.

Figure 11:
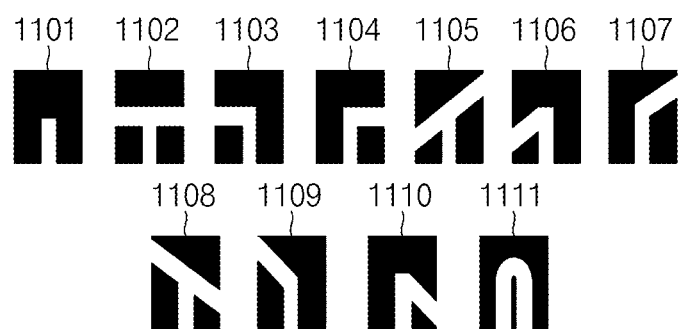
FIG. 11 illustrates a type of an entrance point according to various embodiments.

FIG. 11 illustrates a type of an entrance point according to various embodiments.

Referring to FIG. 11, a vehicle system device 100 of FIG. 1 may obtain or learn and store data 1101 to 1111 for various entrance point types. The entrance point type may be determined based on whether there is a parking slot and an angle where the parking slot and a parking line meet. The entrance point type may include, for example, an open type 1101, a T type 1102, a left L type 1103, a right L type 1104, a T type 1105 slanted to the left, a left L type 1106 to be slanted to the left, a right L type 1107 slanted to the left, a T type 1108 slanted to the right, a left L type 1109 slanted to the right, a right L type 1110 slanted to the right, and a U type 1111.

Figure 12:
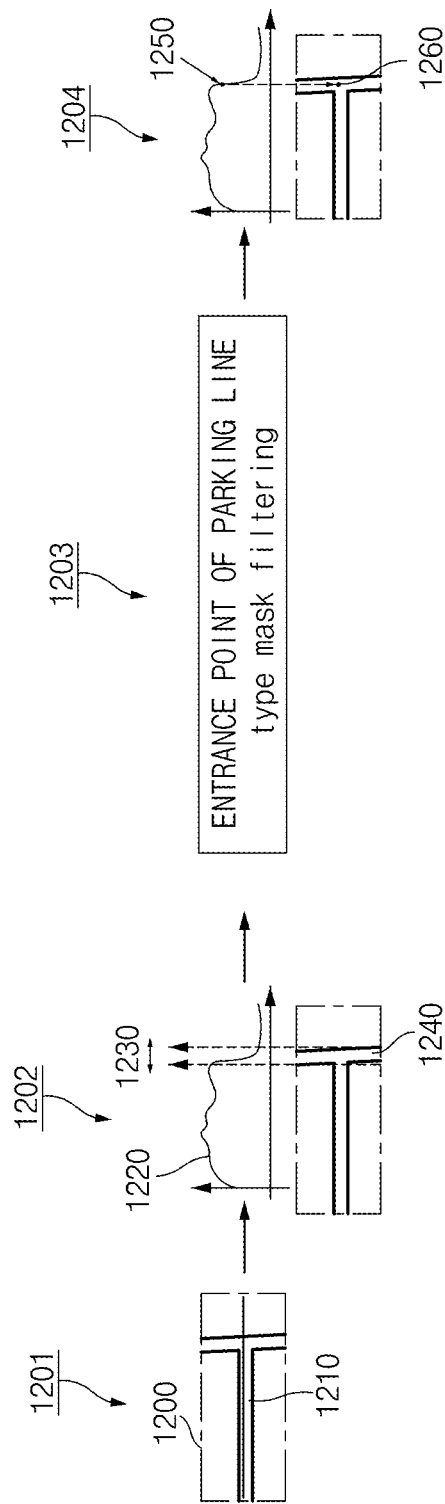
FIG. 12 illustrates an operation for detecting an entrance point according to various embodiments.
Figure 13:
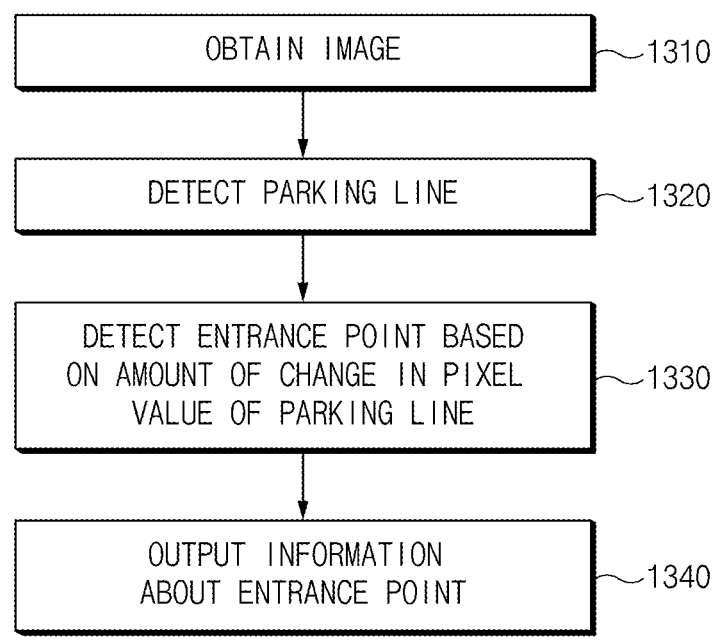
FIG. 13 illustrates an operational flowchart of a vehicle system device for outputting information about an entrance point according to various embodiments.
Figure 14:
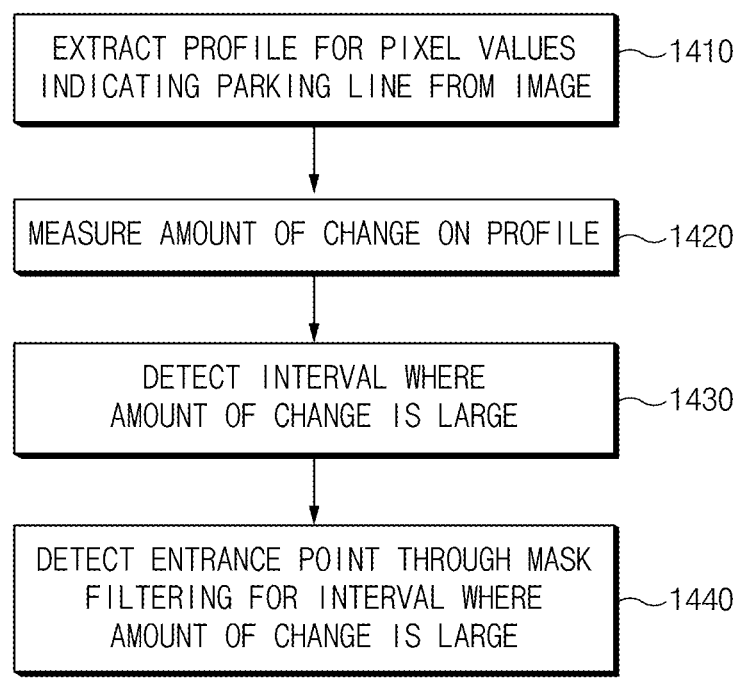
FIG. 14 illustrates an operational flowchart of a vehicle system device for detecting an entrance point according to various embodiments.

FIGS. 12 to 14 illustrate an operation for outputting information about an entrance point according to an embodiment.

Referring to FIG. 12, in operation 1201, a controller 120 of FIG. 1 may detect a parking line 1210 from an obtained image 1200. In operation 1202, the controller 120 may extract a profile 1220 for pixel values of the detected parking line 1210. An x-axis of a graph indicating the profile 1220 may indicate an x-axis distance in the image 1200, and a y-axis of the graph may refer to a pixel value. An interval 1230 where the amount of change is large on the graph (or an interval where the amount of change is greater than a threshold) may refer to an interval 1240 where the parking line is ended. The controller 120 may know that there is an entrance point at a location adjacent to the interval 1240 where the parking line 1210 is ended, but a result for a location and type of the entrance point may fail to be accurate when the interval 1230 where the amount of change is large in width or when a difference of the amount of change is not large.

To more accurately recognize the location and type of the entrance point, in operation 1203, the controller 120 may detect an entrance point through mask filtering for the interval (e.g., 1230 of FIG. 12) where the amount of change is large. The mask filtering may refer to a scheme of comparing a form for the interval where the amount of change is large with data previously stored in a vehicle system device 100 of FIG. 1. The previously stored data may refer to, for example, data for various entrance point types indicated in FIG. 11. The controller 120 may compare the interval 1210 in the image 1200 corresponding to the interval 1230 where the amount of change is large with previously stored data to determine an entrance point type with the highest matching score as an entrance point type of the interval. The controller 120 may more accurately detect a location of the entrance point based on the previously detected parking line and the determined entrance point type. For example, in operation 1204, the controller 120 may determine a first point 1250 on the graph as a location of an entrance point 1260 in the image 1200.

FIG. 13 illustrates an operational flowchart of a vehicle system device for outputting information about an entrance point according to an embodiment. In the description below, operations included in the operational flowchart may be performed by a vehicle system device 100 of FIG. 1 or may be performed by components included in the vehicle system device 100. For example, a controller 120 of the vehicle system device 100 may control other components (e.g., an image sensing device 110 and an output device 140 of FIG. 1) to perform operations of the operational flowchart. For another example, in operation 1320 may be performed by a parking line detector 122 of FIG. 1, and operation 1330 and operation 1340 may be performed by an entrance point detector 126 of FIG. 1.

Referring to FIG. 13, in operation 1310, the controller 120 may obtain an image using the image sensing device 110. The obtained image may include, for example, a surround, 360-degree view image that surrounds a vehicle including the vehicle system device 100.

In operation 1320, the controller 120 may detect a parking line pair from the obtained image. For example, the controller 120 may perform filtering (e.g., Gaussian filtering) to remove noise due to raw data or the surround view image obtained by way of the image sensing device 110 and may extract edge data from the filtered image. The controller 120 may determine a point determined as being a line in the image as a line feature point. The line feature point may include, for example, location information (e.g., x and y coordinates) and direction information based on a gradient, in the image. The controller 120 may perform line fitting for the determined line feature point. For example, the controller 120 may extract lines by clustering feature points, each of which has a similar direction and location, among the determined line feature points. The extracted lines (i.e., parking lines) may include both end points (e.g., x and y coordinates) and direction information.

In operation 1330, the controller 120 may detect an entrance point based on an amount of change in a pixel value of the detected parking line. For example, an amount of change between pixel values corresponding to the parking line is not large, whereas a pixel value at a point where the parking line is ended has a large difference with the pixel value corresponding to the parking line. Thus, the controller 120 may determine a point, where the amount of change is large, as an entrance point.

In operation 1340, the controller 120 may output information about the entrance point. The information about the entrance point may include at least one of, for example, a location, an angle, a direction, or a type of the entrance point. In an embodiment, the controller 120 may deliver the information about the entrance point to another component of the vehicle system device 100 for autonomous driving. For another example, the controller 120 may display the information about the entrance point on an output device 140 of FIG. 1 such that a user may identify the entrance point.

FIG. 14 illustrates an operational flowchart of a vehicle system device for detecting an entrance point according to an embodiment. Operations shown in FIG. 14 may be implemented by a controller 120 or an entrance point detector 126 of FIG. 1.

Referring to FIG. 14, in operation 1410, the controller 120 may extract a profile for pixel values indicating a parking line from an image.

In operation 1420, the controller 120 may measure an amount of change on the profile.

In operation 1430, the controller 120 may detect an interval where the amount of change is large. In an embodiment, the controller 120 may detect an interval where the amount of change in pixel value is greater than a specified threshold.

In operation 1440, the controller 120 may detect an entrance point through mask filtering for the interval (e.g., 530 of FIG. 5) where the amount of change is large. The mask filtering may refer to a scheme of comparing a form for the interval where the amount of change is large with data previously stored in a vehicle system device 100 of FIG. 1.

FIGS. 15 to 18 illustrate an operation for outputting information about an entrance point according to another embodiment.

Figure 15:
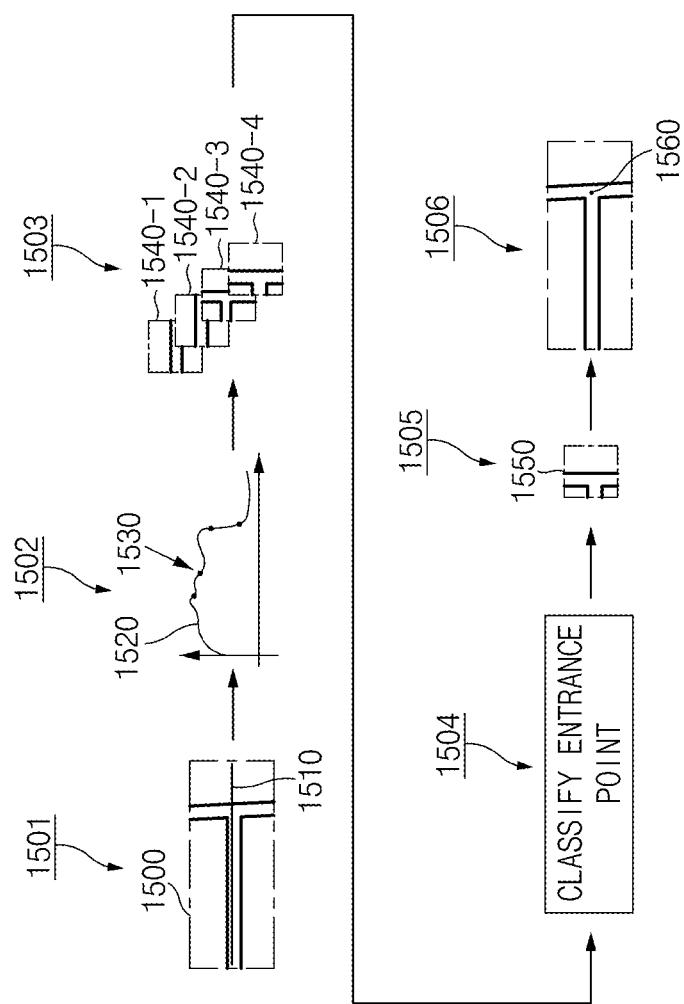
FIG. 15 illustrates another operation for detecting an entrance point according to various embodiments.

Referring to FIG. 15, in operation 1501, a controller 120 of FIG. 1 may detect a parking line 1510 from an obtained image 1500. For example, the controller 120 may preprocess the obtained image 1500 and may detect the parking line 1510 through feature point extraction and line fitting of the preprocessed image 1500.

In in operation 1502, the controller 120 may extract a profile 1520 for pixel values of the detected parking line 1510. An x-axis of a graph indicating the profile 1520 may indicate an x-axis distance in the image 1500, and a y-axis of the graph may refer to a pixel value. The controller 120 may measure an amount of change in a pixel value and may detect an interval (e.g., 1530) where the amount of change is greater than a specified threshold. The interval where the amount of change is greater than the threshold may be plural in number on the profile 1520. In this case, the controller 120 may determine an interval as an entrance point candidate group.

According to an embodiment, the controller 120 may set the number of entrance point candidate groups to N (where N is a natural number). In this case, the controller 120 may use N entrance point candidate groups, each of which has the largest amount of change, among the plurality of entrance point candidate groups, each of which has the amount of change greater than the threshold.

In in operation 1503, the controller 120 may extract an image (e.g., 1540-1, 1540-2, 1540-3, or 1540-4) for each of the entrance point candidate groups. In in operations 1504 to 1506, the controller 120 may classify an image for each of the entrance point candidate groups by way of a classifier. For example, the controller 120 may compare the image for each of the entrance point candidate groups with data previously learned by the artificial intelligence learning device 130 to determine an image 1550 having the highest confidence as an image corresponding to the entrance point. The classifier may determine a location and type of an entrance point 1560 included in the image 1500 by comparing the image of the entrance point candidate group with previously learned data.

Figure 16:
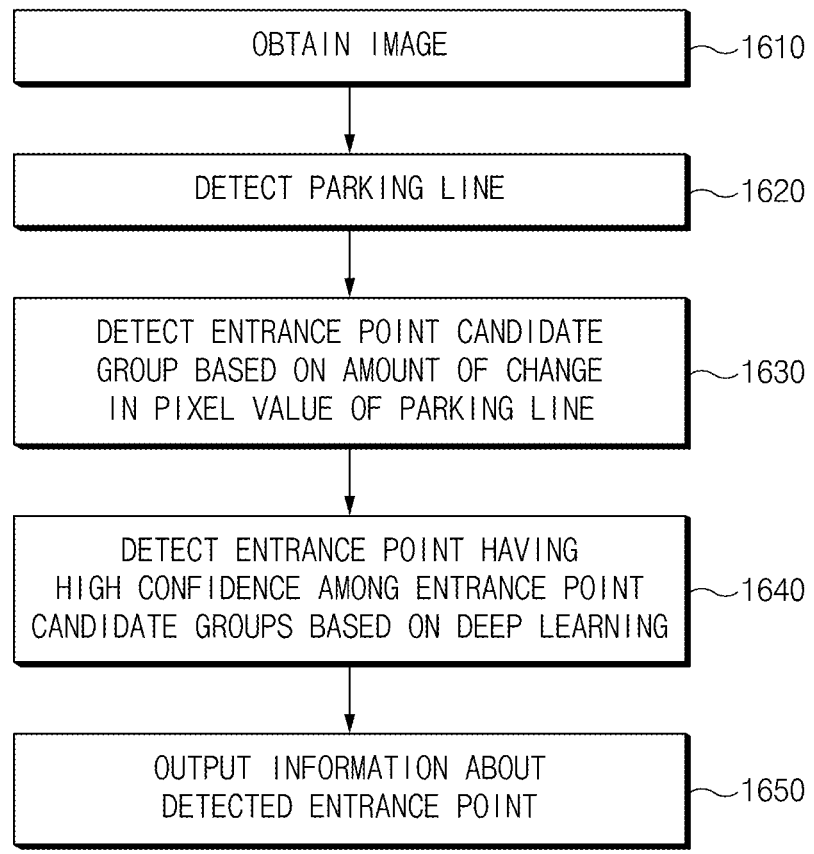
FIG. 16 illustrates another operational flowchart of a vehicle system device for outputting information about an entrance point according to various embodiments.

FIG. 16 illustrates an operational flowchart of a vehicle system device for outputting information about an entrance point according to another embodiment. In the description below, operations included in the operational flowchart may be performed by a vehicle system device 100 of FIG. 1 or may be performed by components included in the vehicle system device 100. For example, a controller 120 of the vehicle system device 100 may control other components (e.g., an image sensing device 110, an artificial intelligence learning device 130, and an output device 140 of FIG. 1) to perform operations of the operational flowchart. For another example, operation 1620 may be performed by a parking line detector 122 of FIG. 1, and operations 1630 to 1650 may be performed by an entrance point detector 126 of FIG. 1.

Referring to FIG. 16, in operation 1610, the controller 120 may obtain an image using the image sensing device 110. The obtained image may include, for example, a surround view 360-degree image that surrounds a vehicle including the vehicle system device 100.

In operation 1620, the controller 120 may detect a parking line from the obtained image. For example, the controller 120 may perform filtering (e.g., Gaussian filtering) to remove noise due to raw data or the surround view image obtained by way of the image sensing device 110 and may extract edge data from the filtered image. The controller 120 may determine a point determined as being a line in the image as a line feature point. The line feature point may include, for example, location information (e.g., x and y coordinates) and direction information based on a gradient in the image. The controller 120 may perform line fitting for the determined line feature point. For example, the controller 120 may extract lines by clustering feature points, each of which has a similar direction and location, among the determined line feature points. The extracted lines (i.e., parking lines) may include both end points (e.g., x and y coordinates) and direction information.

In operation 1630, the controller 120 may detect an entrance point candidate group based on an amount of change in a pixel value of the detected parking line. For example, an amount of change between pixel values corresponding to the parking line is not large, whereas a pixel value at a point where the parking line is ended has a large difference with the pixel value corresponding to the parking line. Thus, the controller 120 may determine a point, where the amount of change is large, as an entrance point candidate group.

In operation 1640, the controller 120 may detect an entrance point having high confidence among the entrance point candidate groups based on deep learning. For example, the controller 120 may compare data determined as the entrance point candidate group with data learned by the artificial intelligence learning device 130 and may select an entrance point candidate group having high confidence as a result of the compared result.

In operation 1650, the controller 120 may output information about the entrance point. The information about the entrance point may include at least one of, for example, a location, an angle, a direction, or a type of the entrance point. In an embodiment, the controller 120 may deliver the information about the entrance point to another component of the vehicle system device 100 for autonomous driving. For another example, the controller 120 may display the information about the entrance point on an output device 140 of FIG. 1 such that a user may identify the entrance point.

Figure 17:
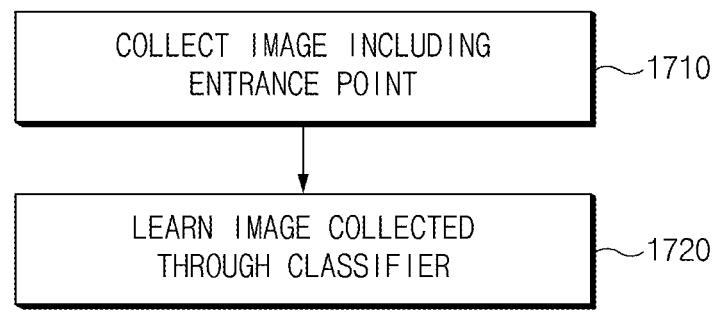
FIG. 17 illustrates an operational flowchart of a vehicle system device for learning data for an entrance point according to various embodiments.

FIG. 17 illustrates an operational flowchart of a vehicle system device for learning data for an entrance point according to various embodiments.

Referring to FIG. 17, in operation 1710, an artificial intelligence learning device 130 of FIG. 1 may collect an image including an entrance point.

In operation 1720, the artificial intelligence learning device 130 may learn an image collected through a deep learning classifier. The deep learning classifier may use at least one scheme among, for example, multilayer perception (MLP), support vector machine (SVM), or a deep neural network (DNN).

Figure 18:
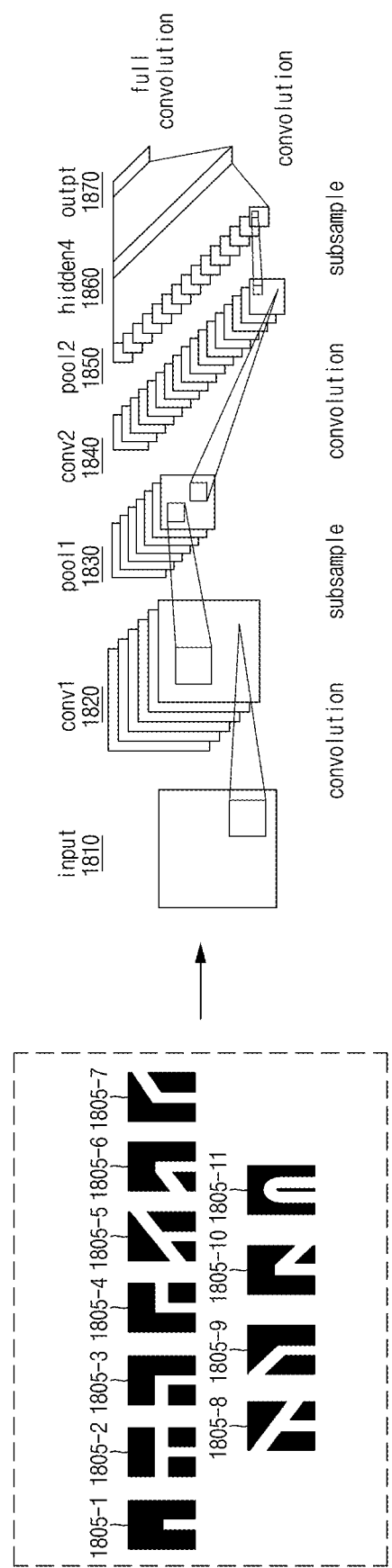
FIG. 18 illustrates an operation for learning data for an entrance point according to various embodiments.

FIG. 18 illustrates an operation for learning data for an entrance point.

A method for learning data for an entrance point, which will be described below, may be performed by way of an artificial intelligence learning device 130 of a vehicle system device 100 of FIG. 1 or may be performed by way of a separate server linked with the vehicle system device 100. In this case, the vehicle system device 100 may detect an entrance point by receiving a learned result from the server.

The artificial intelligence learning device 130 may obtain and collect images, each of which includes the entrance point, by way of an image sensing device 110 of FIG. 1. The artificial intelligence learning device 130 may obtain a plurality of images, each of which includes an entrance point, while changing a place (e.g., a parking lot), weather, and a type of the entrance point. The entrance point type may be an example shown in FIG. 11, but not limited thereto.

The artificial intelligence learning device 130 may generate a local patch image to be used for learning in the image including the entrance point and may learn the local patch image by means of the deep learning classifier. The deep learning classifier may learn data for the entrance point based on various types of artificial intelligence models. For example, the deep learning classifier may enhance accuracy of image recognition by learning a type of the entrance point using a CNN structure. A process (1810 to 1870) where the data for the entrance point is learned by the deep learning classifier may be similar in principle to the process (1010 to 1070) where the data for the parking slot is learned in FIG. 10. In this case, an input 1810 of the deep learning classifier may be local patch images indicating various types of entrance points and an entrance point type indicated by each image. Furthermore, a feature indicated by reduced images may be to distinguish an entrance point, which may include a location, a direction, an angle, a form, or the like of the entrance point. The deep learning classifier may classify an entrance point with high confidence among the entrance point candidate groups using a learned result 1870.

According to embodiments disclosed herein, the vehicle system device may more accurately recognize a parking area where there are no objects around the parking area.

According to embodiments disclosed herein, the vehicle system device may more accurately recognize an entrance point in a parking area where there are no objects around the parking area.

In addition, various effects ascertained directly or indirectly through the embodiments disclosed herein may be provided.

Hereinabove, although exemplary embodiments have been described with reference to the accompanying drawings, these embodiments are not limited thereto, but may be variously modified and altered by those skilled in the art to which the exemplary embodiments pertain without departing from the spirit and scope of the invention as set forth in the following claims.

What is claimed is:

1. A vehicle parking assistance device, comprising:
   an image sensing device;
   an artificial intelligence learning device; and
   a controller connected with the image sensing device and the artificial intelligence learning device,
   wherein the controller is configured to:
   obtain an image using the image sensing device;
   detect at least one parking line pair in the obtained image;
   detect a parking slot based on deep learning;
   detect a parking area based on the detected parking slot and the at least one detected parking line pair that correspond to first and second boundaries of the detected parking slot;
   detect an entrance point for the parking area; and
   generate parking information for autonomous parking of a vehicle based on the parking area and the entrance point,
   wherein the image sensing device takes an image at periodic time intervals, and wherein the detect an entrance point for the parking area is determined when an amount of change in pixel value of the image obtained using the image sensing device at a first point in time of the periodic time intervals as compared to the image obtained using the image sensing device at a second point in time directly subsequent to the first point of time, is greater than a predetermined threshold.

2. The vehicle parking assistance device of claim 1, wherein the controller is configured to:
   obtain a surround view, 360-degree image of an area surrounding the vehicle using the image sensing device.

3. The vehicle parking assistance device of claim 1, wherein the controller is configured to:
   detect a plurality of parking line candidate groups in the obtained image; and
   detect the at least one parking line pair which is parallel to each other and has a specified interval among the plurality of parking line candidate groups.

4. The vehicle parking assistance device of claim 3, wherein the controller is configured to:
   preprocess image data of the obtained image;
   detect a line feature point from the preprocessed image data;
   perform line fitting for the detected line feature point; and
   detect the plurality of parking line candidate groups based on the line fitting.

5. The vehicle parking assistance device of claim 1, further comprising:
   an output device,
   wherein the controller is configured to:
   output the parking information in an audible manner through the output device.

6. The vehicle parking assistance device of claim 1, wherein the controller is configured to:
   detect, using an artificial learning device, the parking slot based on a deep neural network (DNN).

7. The vehicle parking assistance device of claim 1, wherein the parking information includes at least one of identification information about a location and an angle of the entrance point, or a type of the parking slot.

8. The vehicle parking assistance device of claim 1, wherein the parking slot comprises one of a diagonal type or a stepped type of a parking slot.

9. A method comprising:
   obtaining an image;
   detecting at least one parking line pair in the obtained image;
   detecting a parking slot based on deep learning;
   detecting a parking area based on the detected parking slot and the at least one detected parking line pair that correspond to first and second boundaries of the detected parking slot;
   detecting an entrance point for the parking area; and
   generating parking information for autonomous parking of a vehicle based on the parking area and the entrance point,
   wherein the image is obtained at periodic time intervals, and wherein the detecting an entrance point for the parking area is determined when an amount of change in pixel value of the image obtained at a first point in time of the periodic time intervals as compared to the image obtained at a second point in time directly subsequent to the first point of time, is greater than a predetermined threshold.

10. The method of claim 9, wherein the obtaining of the image includes obtaining a surround view, 360-degree image surrounding the vehicle.

11. The method of claim 9, further comprising:
    detecting a plurality of parking line candidate groups in the obtained image,
    wherein the detecting of the at least one parking line pair includes detecting the at least one parking line pair which is parallel to each other and has a specified interval among the plurality of parking line candidate groups.

12. The method of claim 11, wherein the detecting of the plurality of parking line candidate groups includes:
    preprocessing image data of the obtained image;

detecting a line feature point from the preprocessed image data;

performing line fitting for the detected line feature point; and detecting the plurality of parking line candidate groups based on the line fitting.

13. The method of claim 9, further comprising:

outputting the generated parking information.

14. The method of claim 9, wherein the parking information includes at least one of identification information about an angle of the entrance point, or a type of the parking slot.

15. The method of claim 9, wherein detecting a parking slot comprises performing deep learning using an artificial intelligence learning device to detect the parking slot.

16. The method of claim 9, wherein the parking slot comprises at least one of a parallel type, a perpendicular type, a diagonal type, or a stepped type of a parking slot.

17. A non-transitory computer readable program medium comprising program code, that when executed by at least one processor, cause the at least one processor to perform operations comprising:

obtaining an image;

detecting at least one parking line pair in the obtained image;

detecting a parking slot based on deep learning;

detecting a parking area based on the detected parking slot and the at least one detected parking line pair that correspond to first and second boundaries of the detected parking slot;

detecting an entrance point for the parking area; and generating parking information for autonomous parking of a vehicle based on the parking area and the entrance point, wherein the image is obtained at periodic time intervals, and wherein the detecting an entrance point for the parking area is determined when an amount of change in pixel value of the image obtained at a first point in time of the periodic time intervals as compared to the image obtained at a second point in time directly subsequent to the first point of time, is greater than a predetermined threshold.

18. The non-transitory computer readable program medium of claim 17, wherein the program code, when executed by the at least one processor, further causes the at least one processor to perform operations comprising:

obtaining a surround view, 360-degree image surrounding a vehicle using an image sensing device.

* * * * *